Oct. 4, 1960 W. W. MAYNE 2,954,931
FUEL CONTROL SYSTEM
Filed June 12, 1956

WALTER W. MAYNE,
INVENTOR.

BY
ATTORNEY.

United States Patent Office 2,954,931
Patented Oct. 4, 1960

2,954,931
FUEL CONTROL SYSTEM
Walter W. Mayne, 18233 Clark St., Tarzana, Calif.
Filed June 12, 1956, Ser. No. 590,957
3 Claims. (Cl. 236—78)

This invention relates to a fuel control system for a heater, which control system is adapted to maintain an ambient temperature within a given range automatically. For the purpose of disclosure and to illustrate the principles involved, the invention is described herein as specifically directed to the control of a gas-burning furnace in a domestic heating system. Such a disclosure will provide adequate guidance for those skilled in the art who may have occasion to apply the same principles to other specific control purposes.

In a conventional domestic heating system, the operating cycle comprises periodically completely opening and completely closing a fuel valve, this cycle being controlled by a thermostat that opens the fuel valve when the ambient temperature reaches a predetermined minimum, and closes the fuel valve when the ambient temperature reaches a predetermined maximum. It is desirable to have the minimum and maximum temperatures relatively close together to avoid wide temperature swings, but, if the thermostat operates over a narrow temperature range, the operating cycle must be repeated at a relatively high frequency since the fully open fuel valve causes the ambient temperature to rise rapidly and closing the fuel valve causes the ambient temperature to drop rapidly. It is highly objectionable, however, to open and close a fuel valve in a domestic heating system at relatively high frequency, not only because such operation reduces the service life of the valve, but also because operation of the valve usually creates a certain amount of noise that becomes noticeable when repeated too frequently. For these reasons, the thermostat in a conventional heating system operates over a relatively wide range and the ambient temperature swings back and forth between the widely separated upper and lower limits of this range.

The broad object of the present invention is to provide a relatively simple and highly reliable cyclic control system that maintains the ambient temperature within a relatively narrow range and does so without unduly frequent repetition of the operating cycle. To achieve this broad object, the invention includes two fuel lines to supply the heater or furnace, one of the two fuel lines being open continuously when the system is in operation, the other fuel line being controlled by a cutoff valve that opens and closes in response to a thermostat in the usual manner.

If the continuously open fuel line supplies fuel at a rate just under the current demand rate, the intermittently operated valve merely adds a marginal supply of fuel and the thermostat controlling the intermittent operation may be adjusted for an exceptionally narrow temperature range. The narrow temperature range does not cause too frequent repetition of the valve operating cycle because the continuously open fuel line keeps the ambient temperature from dropping rapidly when the thermostatically controlled valve is closed.

Successful operation of such a system requires that the rate of fuel flow through the continuously open fuel line rise and fall with the demand, leaving at all times only a marginal quantity of fuel to be supplied by the intermittently operated fuel valve. A further object of the invention, therefore, is to provide automatic adjustment of the level of fuel flow through the continuously open fuel line in accord with the changes in the demand for heat.

This further object of the invention is attained by providing an adjustable valve in the continuously open fuel line and by further providing means to reduce the setting of the adjustable valve progressively at a gradual rate when the intermittently operated valve is closed, and to raise the setting of the adjustable valve progressively when the intermittently operated valve is open. When the demand for heat rises, the time periods during which the intermittently opened valve is open lengthen, in comparison with the time periods during which the valve is closed, with consequent relative lengthening of the periods in which the setting of the adjustable valve is raised. On the other hand, when the demand for heat drops, the time periods when the valve is closed are longer than the time periods when the valve is open, with the result that the setting of the adjustable valve is lowered. Thus, during operation of the system, the rate of fuel flow through the continuously open fuel line always undulates, but the average level of the undulating fuel flow rises and falls to the changes in heat demand.

A further object of the preferred practice of the invention is to vary the rate of flow through the intermittently operated valve in the same manner as the rate of flow through the continuously open fuel line. By virtue of this arrangement, the rate of the marginal intermitten supply of fuel tends desirably to be proportional to the rate of continuous supply. This further object is achieved by placing a second adjustable valve in series with the intermittently operated valve and by progressively varying the setting of this second adjustable valve in the same manner as the first-mentioned adjustable valve in the continuously open fuel line.

The various objects, features and advantages of the invention may be understood by reference to the following detailed description and the accompanying drawing.

In the drawing, which is to be regarded as merely illustrative:

Figure 1:
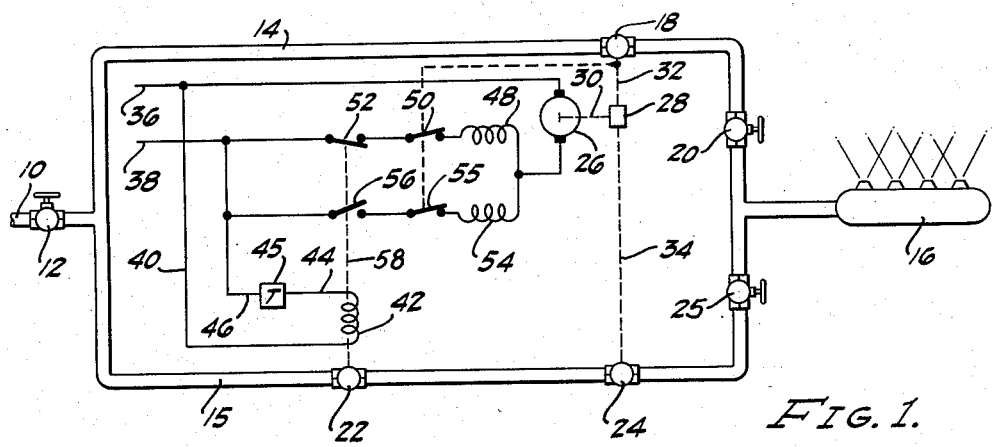
Fig. 1 is a diagram illustrating the presently preferred embodiment of the invention.

Fig. 1 shows a main fuel supply line 10 having a main valve 12. This line may supply gaseous fuel, for example. The main fuel line 10 is connected to two branch lines 14 and 15 which are connected in parallel to supply a fuel burner 16 in a domestic heating system.

The branch line 14 has an automatically adjusted valve 18 and preferably also has a manually adjustable valve 20. The branch line 15 has a normally closed solenoid valve 22, an automatically adjusted valve 24, and, preferably, is also provided with a manually adjustable valve 25. For the purpose of automatically adjusting the setting of the two valves 18 and 24, a suitable reversible motor 26 is operatively connected to reduction gearing in a gear box 28, as indicated by the dotted line 30, and the reduction gearing is operatively connected to the two valves 18 and 24, as indicated by the dotted lines 32 and 34, respectively.

The wiring diagram incorporated in Fig. 1 includes two leads 36 and 38 from a suitable voltage source. Lead 36 is connected to one side of the motor 26 and is also connected by a wire 40 with one side of the coil 42 of the solenoid valve 22. The circuit through the solenoid coil 42 is completed by a wire 44, a thermostat 45, and a wire 46 to the lead 38.

The lead 38 is connected to one field coil 48 of the motor 26 through a normally closed limit switch 50 and a second normally closed control switch 52, these two switches being in series. In like manner, the same lead 38 is connected to the second field coil 54 of the motor 26, through a normally closed limit switch 55 and a second normally open control switch 56 in series therewith. Limit switch 50 opens whenever the two valves 18 and 24 fully close and limit switch 55 opens whenever the two valves fully open. If desired, valve 18 may incorporate a bypass for a predetermined minimum flow of fuel when the valve is closed.

The thermostat 45 may be of a conventional type used for domestic heating, but will usually be set for a relatively narrow operating range. Thus, the upper ambient temperature at which the thermostat opens the circuit through the solenoid coil 42 and the lower ambient temperature at which it closes the circuit will usually be only a relatively few degrees apart in comparison with a thermostat in a domestic heating system.

The two valves 18 and 24 are operatively connected to the gear box 28 to operate in the same respect so that the motor 26 functions either to progressively raise the settings of both valves for increased fuel flow to the burner 16, or to progressively reduce the settings of both valves for decreasing the rate of fuel supplied to the burner. It is contemplated that the range of mechanical operation of both of the valves 18 and 24 will be the same so that both will fully close or fully open together. Preferably, however, the flow capacity of valve 18 is substantially larger than the flow capacity of valve 24. The two limit switches 50 and 55 open the motor circuit whenever the two valves reach their limit settings.

The normally closed control switch 52 for the field coil 48 and the normally open control switch 56 for the field coil 54 are both operatively connected to the solenoid valve 22 to respond to energization of the solenoid coil 42, as indicated by the dotted line 58. Thus, when the solenoid coil 42 is de-energized, the normally closed control switch 52 completes a circuit through the field coil 48 for causing the motor 26 to rotate in one direction to progressively reduce the settings of the two valves 18 and 24; and conversely, when the solenoid coil 42 is energized, the normally closed control switch 52 is opened and the normally open control switch 56 is closed to complete a circuit through the second field coil 54 to cause the motor 26 to rotate in the opposite direction to progressively raise the settings of the two valves 18 and 24 for increasing the rate of fuel flow to the burner 16.

It is apparent that, if the thermostat tends to keep the solenoid coil 42 energized for relatively long periods and de-energized for relatively short periods, the average rate of fuel flow is progressively increased and vice versa. If the demand for heat is increasing, for example, when the outdoor temperature is falling, the duration of the time periods in which the solenoid coil 42 is energized will exceed the duration of the time periods in which the solenoid coil is de-energized. Thus, the solenoid valve 22 may be open for three minutes and closed for two minutes. With longer open periods than closed periods, the motor 26 progressively raises the settings of the two adjustable valves 18 and 24, and thus progressively raises the average rate of fuel flow to the burner 16. When the average flow level is reached that is adequate for the demand for heat, the control system attains a balance in the sense that the duration of the time periods in which the solenoid coil 42 is energized equals the duration of the time periods in which the solenoid coil is de-energized.

If the demand for heat is lowered, for example by a rise in the outdoor temperature, the reverse adjustment action occurs. Thus, the solenoid coil 42 may be energized only two minutes at a time and may be de-energized for three minutes. As a result of the periods of de-energization exceeding the periods of energization, the average settings of the two valves 18 and 24 are reduced to reduce the average rate of fuel flow to the burner 16. If the demand for heat ceases entirely, the motor 26 completely closes both valves 18 and 24, and then the motor is de-energized by the automatic opening of the limit switch 50.

Figure 2:
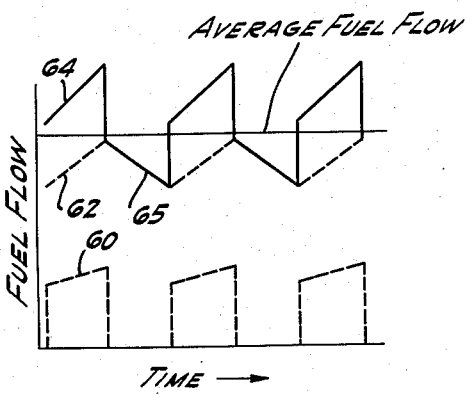
Fig. 2 is a graph showing a typical pattern of varying fuel flow in the operation of the system shown in Fig. 1.

Fig. 2 indicates the general character of the cycle of fuel flow when the system is in balance with the solenoid coil 42 energized and de-energized for equal time periods to maintain an evarge fuel flow that just meets the demand for heat. During the time intervals in which the solenoid valve 22 is open, fuel flows therethrough at an increasing rate, represented by the dotted line 60. At the same time, fuel flows through the larger capacity valve 18 at an increasing rate, indicated by the dotted line 62. The total fuel flow to the burner 16 is the sum of these two increasing rates, as represented by the rising solid line 64. When the solenoid valve 22 is closed, all of the fuel that is supplied to the burner 16 flows through the continuously open larger valve 18 at a rate indicated by the solid line 65. The solid line 65 indicates a decreasing rate of fuel flow since the motor 26 progressively lowers the settings of both of the valves 18 and 24 during any period in which the solenoid valve 22 is closed.

Figure 4:
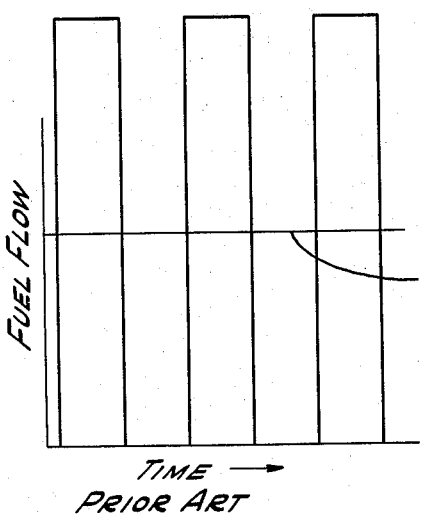
Fig. 4 is a graph showing the pattern of fuel flow that is characteristic of a typical prior art conventional fuel control system.

It will be noted in Fig. 2 that the peaks and valleys of the fluctuation of the fuel flow are departures of only relatively small magnitude from the average rate of fuel flow, these departures from average being small enough to be unnoticeable to a person in a house heated by the system. In contrast, a prior art fuel system operates with wide departures from the average rate of fuel flow, as shown in Fig. 4. An occupant of a house heated by a fuel system operating in the manner indicated by Fig. 4, notices the wide swings in temperature and usually feels too warm part of the time and too cold part of the time.

If desired, the operation of the fuel control system shown in Fig. 1 may be modified by manipulation of the manually adjustable valves 20 and 25. Thus, the rates of maximum flow through the valves 18 and 24, respectively, may be reduced, and fuel flow through either of the branch lines 14 and 15 may be completely cut off, if desired.

The fuel control system shown in Fig. 1 may also be modified by omitting the automatically adjusted valve 24. With this omission, the motor 26 varies the adjustment of the valve 18 alone, and whenever the solenoid valve 22 is opened, fuel flows through the branch line 15 at a constant maximum rate determined by the setting of the manual valve 25. With the fuel system modified in this manner by the omission of the valve 24, the fuel flow pattern with the system in balance will be of the character indicated by Fig. 3.

When the solenoid valve 22 is open, the fuel flows therethrough at a constant rate, as indicated by the dotted line 66, and, at the same time, fuel flows through the valve 18 at a progressively increasing rate, as indicated by the dotted line 68. The total rate of fuel flow is represented by the rising solid line 70.

Figure 3:
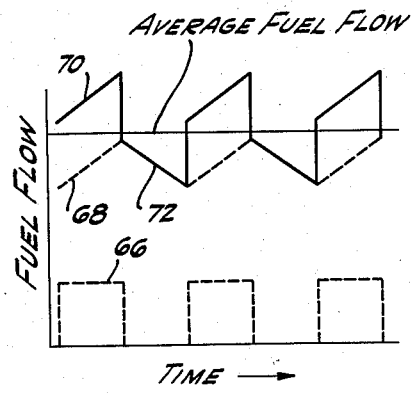
Fig. 3 is a similar graph showing how this pattern may be modified by omitting one of the valves in Fig. 1.

When the solenoid valve 22 is closed, the rate of fuel flow through the valve 18 progressively drops, as indicated by the solid line 72. Thus, the flow pattern in Fig. 3 is similar to the flow pattern in Fig. 2, but the rate of fuel flow does not rise as rapidly during the periods when the solenoid valve 22 is open.

My description in specific detail of selected practices of the invention will suggest to those skilled in the art various changes, substitutions and other departures from my disclosure that properly lie within the spirit and scope of the appended claims.

I claim as my invention:

1. In a fuel system for automatically supplying fuel to a heater to control ambient temperature, the combination of: a first fuel line and a second fuel line to supply fuel to said heater independently; an adjustable valve in said first fuel line; an adjustable valve in said second fuel line; a cutoff valve in said second fuel line; means to vary the adjustment of both of said adjustable valves simultaneously in the same respect to vary the rates of flow through said first and second fuel lines, said varying means being reversible; and means including a thermostat responsive to said ambient temperature to close said cutoff valve and reverse said reversible means from increasing rate to decreasing rate when the ambient temperature rises to a predetermined maximum, and to open the cutoff valve and reverse said reversible means from decreasing rate to increasing rate when the ambient temperature reaches a predetermined minimum.

2. In a fuel system for automatically supplying fuel to a heater to control ambient temperature, the combination of: a first fuel line and a second fuel line to supply fuel to said heater independently; an adjustable valve in said first fuel line; an adjustable valve in said second fuel line; a cutoff valve in said second fuel line; thermostat means responsive to said ambient temperature and operatively connected to said cutoff valve for periodically opening said cutoff valve to maintain the ambient temperature; and a reversible motor operatively connected to both of said adjustable valves to vary the settings of both valves simultaneously in the same respect in a gradual manner, said motor being reversible in response to said thermostat to progressively raise the settings of both of said adjustable valves when said cutoff valve is opened and to progressively lower the settings of both of the adjustable valves when the cutoff valve is closed.

3. In a fuel system for automatically supplying fuel to a heater to control ambient temperature, the combination of: a first means to supply fuel to said heater, said means being adjustable to vary the rate of fuel supplied thereby; a second means to supply fuel to said heater, said second means being adjustable to vary the rate of fuel supplied thereby; reversible motor means to run in a continuous manner in either direction to correspondingly progressively vary the adjustment of both said first means and said second means; and means including a thermostat responsive to said ambient temperature to cut off said second means and reverse said reversible motor means from increasing the rate of supply by said first and second means to decreasing the rate when the ambient temperature rises to a relatively high value and to restore supply by said second means and reverse said reversible motor means from decreasing the rate of supply by said first and second means to increasing the rate when the ambient temperature drops to a relatively low value, whereby the on time periods are longer than the off time periods of said second means when the rate of fuel supply fails to meet the demand for heat, the on time periods are shorter than the off time periods when the rate of fuel supply exceeds the demand for heat and the on and off times are equal when the fuel supply balances with the demand for heat.

References Cited in the file of this patent

UNITED STATES PATENTS

| | | |
|---|---|---|
| 1,960,162 | Moorshead | May 22, 1934 |
| 2,171,147 | Peltier | Aug. 29, 1939 |
| 2,211,694 | Hartig | Aug. 13, 1940 |
| 2,249,844 | Martin | July 22, 1941 |
| 2,302,987 | Walsh | Nov. 24, 1942 |